US012603986B2

(12) United States Patent
Sutou et al.

(10) Patent No.: US 12,603,986 B2
(45) Date of Patent: Apr. 14, 2026

(54) INFORMATION PROCESSING DEVICE, INFORMATION PROCESSING METHOD, AND INFORMATION PROCESSING SYSTEM

(71) Applicant: Sony Group Corporation, Tokyo (JP)

(72) Inventors: Yasuhiro Sutou, Tokyo (JP); Toshio Yamazaki, Tokyo (JP); Seungha Yang, Tokyo (JP); Ryo Hirono, Tokyo (JP)

(73) Assignee: Sony Group Corporation, Tokyo (JP)

( * ) Notice: Subject to any disclaimer, the term of this patent is extended or adjusted under 35 U.S.C. 154(b) by 353 days.

(21) Appl. No.: 17/802,538

(22) PCT Filed: Feb. 18, 2021

(86) PCT No.: PCT/JP2021/006072
§ 371 (c)(1),
(2) Date: Aug. 26, 2022

(87) PCT Pub. No.: WO2021/177042
PCT Pub. Date: Sep. 10, 2021

(65) Prior Publication Data
US 2023/0140518 A1 May 4, 2023

(30) Foreign Application Priority Data
Mar. 3, 2020 (JP) ................................. 2020-035852

(51) Int. Cl.
*H04N 17/02* (2006.01)
*G06T 3/40* (2006.01)
(Continued)

(52) U.S. Cl.
CPC ............. *H04N 17/002* (2013.01); *G06T 3/40* (2013.01); *G06T 11/001* (2013.01); *H04N 23/64* (2023.01); *H04N 23/73* (2023.01)

(58) Field of Classification Search
CPC ...... H04N 17/002; H04N 23/73; H04N 23/64; H04N 5/232; G06T 3/40; G06T 11/001
(Continued)

(56) References Cited

U.S. PATENT DOCUMENTS 9,933,515 B2 * 4/2018 Prokhorov ............ G01S 7/4972
10,546,390 B2 * 1/2020 Shen ......................... G06T 7/00
(Continued)

FOREIGN PATENT DOCUMENTS

CN 104881172 A 9/2015
CN 105096324 A 11/2015
(Continued)

OTHER PUBLICATIONS

International Search Report and Written Opinion mailed on May 18, 2021, received for PCT Application PCT/JP2021/006072, filed on Feb. 18, 2021, 8 pages including English Translation.

*Primary Examiner* — Trang U Tran
(74) *Attorney, Agent, or Firm* — XSENSU LLP

(57) ABSTRACT

The present disclosure relates to an information processing device, an information processing method, and an information processing system capable of achieving simpler camera calibration.
A control unit generates, in a case where calibration is required for a camera of a mobile unit, a first trigger for displaying a pattern imaged by the camera on a mobile terminal, and generates a second trigger for presenting feedback to a user according to whether or not appropriate imaging of the pattern by the camera is possible. The technology according to the present disclosure can be applied to, for example, a mobile unit such as a drone or a mobile terminal such as a smartphone.

20 Claims, 14 Drawing Sheets

(51) Int. Cl.
*G06T 11/00* (2006.01)
*H04N 17/00* (2006.01)
*H04N 23/60* (2023.01)
*H04N 23/73* (2023.01)

(58) Field of Classification Search
USPC ......................................................... 348/144
See application file for complete search history.

(56) References Cited

U.S. PATENT DOCUMENTS

| | | | |
|---|---|---|---|
| 11,061,412 B2 * | 7/2021 | Harada | .................. H04N 23/64 |
| 11,482,008 B2 * | 10/2022 | Huang | .................... G01S 17/89 |
| 12,307,713 B2 * | 5/2025 | Dai | ........................... G06T 7/80 |
| 2015/0130951 A1 | 5/2015 | Olson | |
| 2016/0161602 A1 | 6/2016 | Prokhorov | |
| 2019/0156517 A1 | 5/2019 | Shen et al. | |

FOREIGN PATENT DOCUMENTS

| | | | |
|---|---|---|---|
| CN | 109382821 A | 2/2019 |
| CN | 110689583 A | 1/2020 |
| EP | 3079134 A1 | 10/2016 |
| JP | 2019-30943 A | 2/2019 |
| KR | 10-2015-0077081 A | 7/2015 |

* cited by examiner

(Red)

(Green)

(Blue)

*FIG. 13*

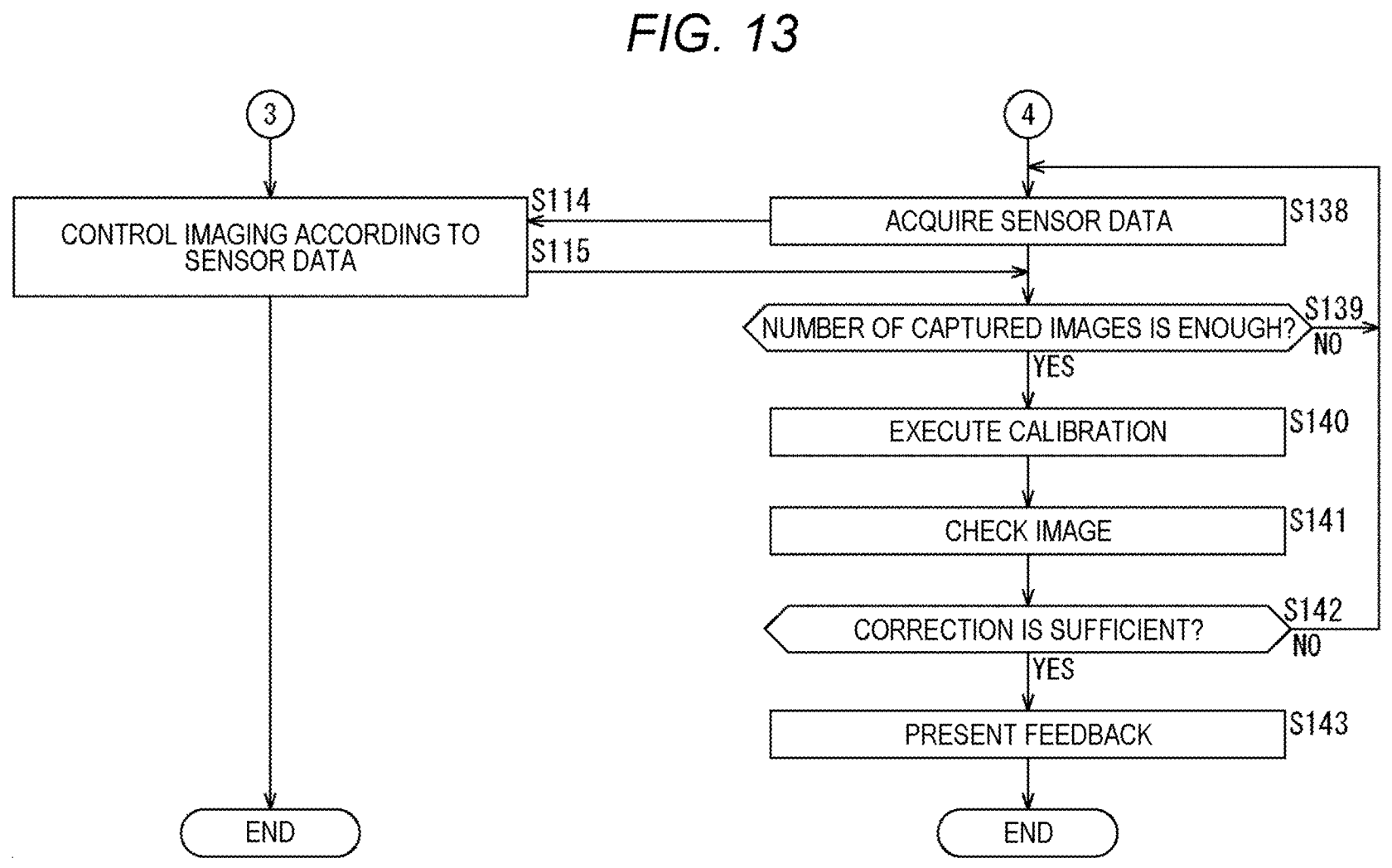

③ → CONTROL IMAGING ACCORDING TO SENSOR DATA → END

S114
S115

④ → ACQUIRE SENSOR DATA (S138)

NUMBER OF CAPTURED IMAGES IS ENOUGH? (S139)
NO →
YES ↓

EXECUTE CALIBRATION (S140)

CHECK IMAGE (S141)

CORRECTION IS SUFFICIENT? (S142)
NO →
YES ↓

PRESENT FEEDBACK (S143)

END

INFORMATION PROCESSING DEVICE, INFORMATION PROCESSING METHOD, AND INFORMATION PROCESSING SYSTEM

CROSS-REFERENCE TO RELATED APPLICATIONS

The present application is based on PCT filing PCT/JP2021/006072, filed Feb. 18, 2021, which claims priority to Japanese Patent Application No. 2020-035852, filed Mar. 3, 2020, the entire contents of each are incorporated herein by reference.

TECHNICAL FIELD

The present disclosure relates to an information processing device, an information processing method, and an information processing system, and more particularly, to an information processing device, an information processing method, and an information processing system capable of achieving simpler camera calibration.

BACKGROUND ART

In recent years, various methods have been proposed for calibration of a camera mounted on a drone.

For example, Patent Document 1 discloses a calibration method in which a calibration signal is generated on the basis of attitude information obtained on the basis of an image captured by an imaging device, and a guide signal is displayed on a screen together with the calibration signal.

CITATION LIST

Patent Document

Patent Document 1: United States Patent Application Publication No. 2019-0156517

SUMMARY OF THE INVENTION

Problems to be Solved by the Invention

Conventionally, calibration of a camera mounted on a drone has been achieved by a user performing imaging with the drone in his/her hand while a calibration pattern such as a circle grid is displayed on a monitor.

However, with this method, it is necessary to prepare a monitor for display and a personal computer (PC) for operation, and it is necessary for the user to operate the PC while holding the drone in his/her hand for imaging. Additionally, it is not easy for the user to determine whether or not imaging is appropriately performed.

The present disclosure has been made in view of such a situation, and an object thereof is to achieve simpler camera calibration.

Solutions to Problems

An information processing device of the present disclosure is an information processing device including a control unit that, in a case where calibration is required for a camera of a mobile unit, generates a first trigger for displaying a pattern imaged by the camera on a mobile terminal, in which the control unit generates a second trigger for presenting feedback to a user according to whether or not appropriate imaging of the pattern by the camera is possible.

An information processing method of the present disclosure is an information processing method including, by an information processing device, generating, in a case where calibration is required for a camera of a mobile unit, a first trigger for displaying a pattern imaged by the camera on a mobile terminal, and generating a second trigger for presenting feedback to a user according to whether or not appropriate imaging of the pattern by the camera is possible.

An information processing system of the present disclosure is an information processing system including: a mobile unit; a mobile terminal; a first control unit that generates, in a case where calibration is required for a camera of a mobile unit, a first trigger for displaying a pattern imaged by the camera on a mobile terminal; and a second control unit that generates a second trigger for presenting feedback to a user according to whether or not appropriate imaging of the pattern by the camera is possible.

In the present disclosure, in a case where calibration is required for a camera of a mobile unit, a first trigger for displaying a pattern imaged by the camera on a mobile terminal is generated, and a second trigger for presenting feedback to a user according to whether or not appropriate imaging of the pattern by the camera is possible is generated.

BRIEF DESCRIPTION OF DRAWINGS

FIG. 3 is a block diagram illustrating a functional configuration example of a mobile terminal.

FIG. 10 is a diagram illustrating a display example of a calibration pattern.

FIG. 11 is a diagram illustrating a display example of a calibration pattern.

FIG. 13 is a flowchart illustrating another example of camera calibration.

MODE FOR CARRYING OUT THE INVENTION

Hereinafter, a mode for carrying out the present disclosure (hereinafter referred to as embodiment) will be described. Note that the description will be given in the following order.

1. Configuration example of camera calibration system
2. Example of camera calibration (example of determining processing on mobile unit side)
3. Display example of calibration pattern 4. Another example of camera calibration (example of determining processing on mobile terminal side)

5. Configuration example of computer

<1. Configuration Example of Camera Calibration System>

(Outline of Camera Calibration System)

Figure 1:
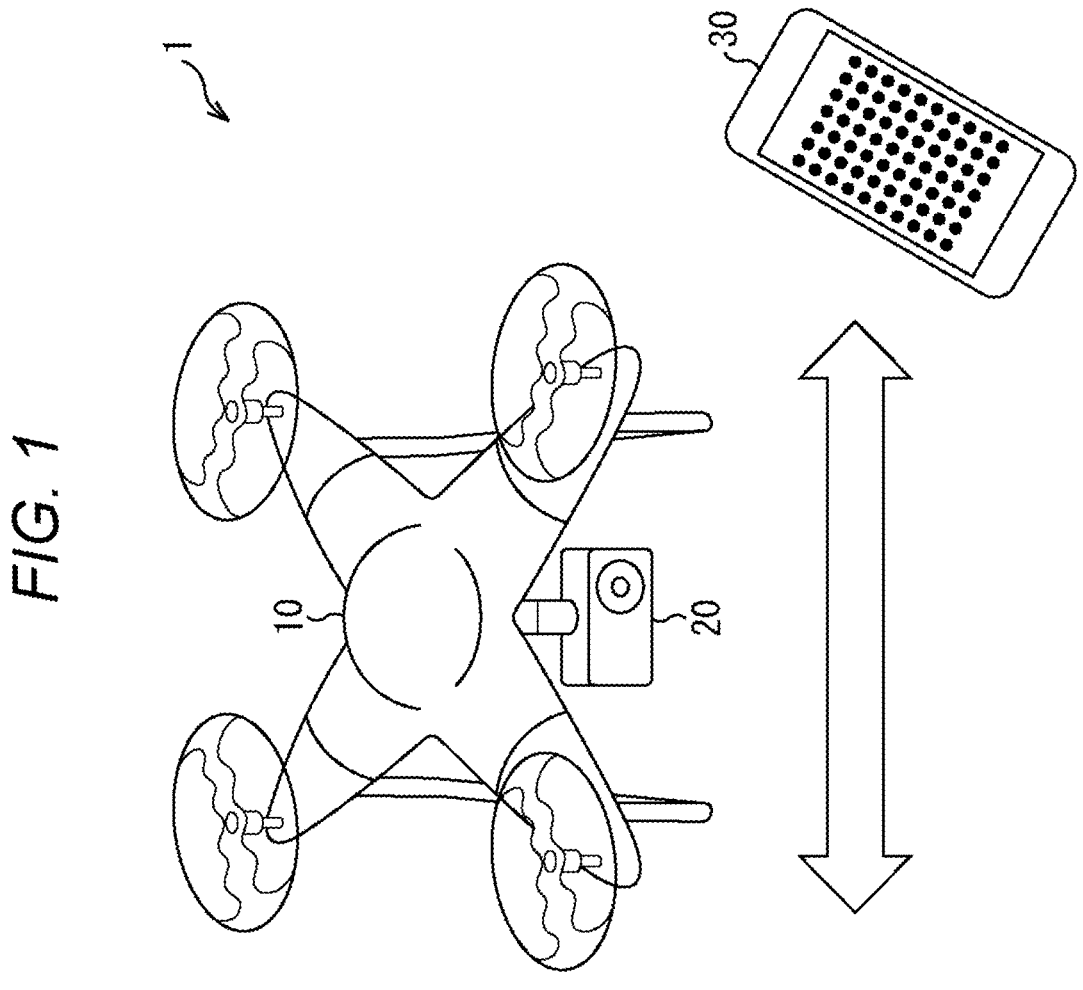
FIG. 1 is a diagram illustrating an outline of a camera calibration system to which a technology according to the present disclosure is applied.

FIG. 1 is a diagram illustrating an outline of a camera calibration system formed as an information processing system to which the technology according to the present disclosure is applied.

A camera calibration system 1 illustrated in FIG. 1 includes a mobile unit 10, a camera 20 included in the mobile unit 10, and a mobile terminal 30.

The mobile unit 10 is formed as, for example, a drone, and autonomously moves (autonomously flies) according to a flight path set in advance or moves (flies) according to a user's operation. The mobile unit 10 may be formed as a robot such as a vehicle, a ship, or a vacuum cleaner in addition to the drone.

Hereinafter, an example in which the technology according to the present disclosure is applied to a drone that flies in the air will be described. However, the technology according to the present disclosure can also be applied to a robot such as a vehicle that moves on land, a ship that moves on water or under water, and a vacuum cleaner that moves indoors.

The camera 20 that captures an image while the mobile unit 10 is moving is mounted on the mobile unit 10.

The camera 20 is connected to a body bottom surface of the mobile unit 10 via, for example, electronically drivable gimbals, and includes a zoom lens. For example, the camera 20 may image the lower side, the left-right direction, the rear side, and the like of the mobile unit 10 in addition to imaging the front side of the mobile unit 10.

The camera 20 may be a monocular camera or a stereo camera. Additionally, the number of cameras 20 mounted on the mobile unit 10 is not limited to one, and a plurality of cameras 20 may be mounted on the mobile unit 10.

The mobile terminal 30 includes a tablet terminal or a smartphone operated by a user, a portable mobile personal computer (PC), or the like. A calibration pattern (hereinafter also simply referred to as pattern) used for calibration of the camera 20 is displayed on a display unit (display) of the mobile terminal 30. According to the calibration, camera parameters such as internal parameters representing a focal length, deviation of an image center, lens distortion, and the like unique to the camera 20, and external parameters representing a position and attitude of the camera 20 are estimated.

Conventionally, calibration of a camera mounted on a drone has been achieved by a user performing imaging with the drone in his/her hand while a pattern such as a circle grid is displayed on a monitor.

However, with this method, it is necessary to prepare a monitor for display and a PC for operation, and it is necessary for the user to operate the PC while holding the drone in his/her hand for imaging. Additionally, it is not easy for the user to determine whether or not imaging is appropriately performed.

On the other hand, in the camera calibration system 1, the user can perform calibration in a state where the mobile unit 10 is placed on a flat place such as on a table. Specifically, in this state, calibration is performed by the user holding the pattern displayed on the mobile terminal 30 over the camera 20 so that the pattern is imaged at various angles. As described above, according to the camera calibration system 1, simpler camera calibration can be achieved.

(Functional Configuration Example of Mobile Unit)

Figure 2:
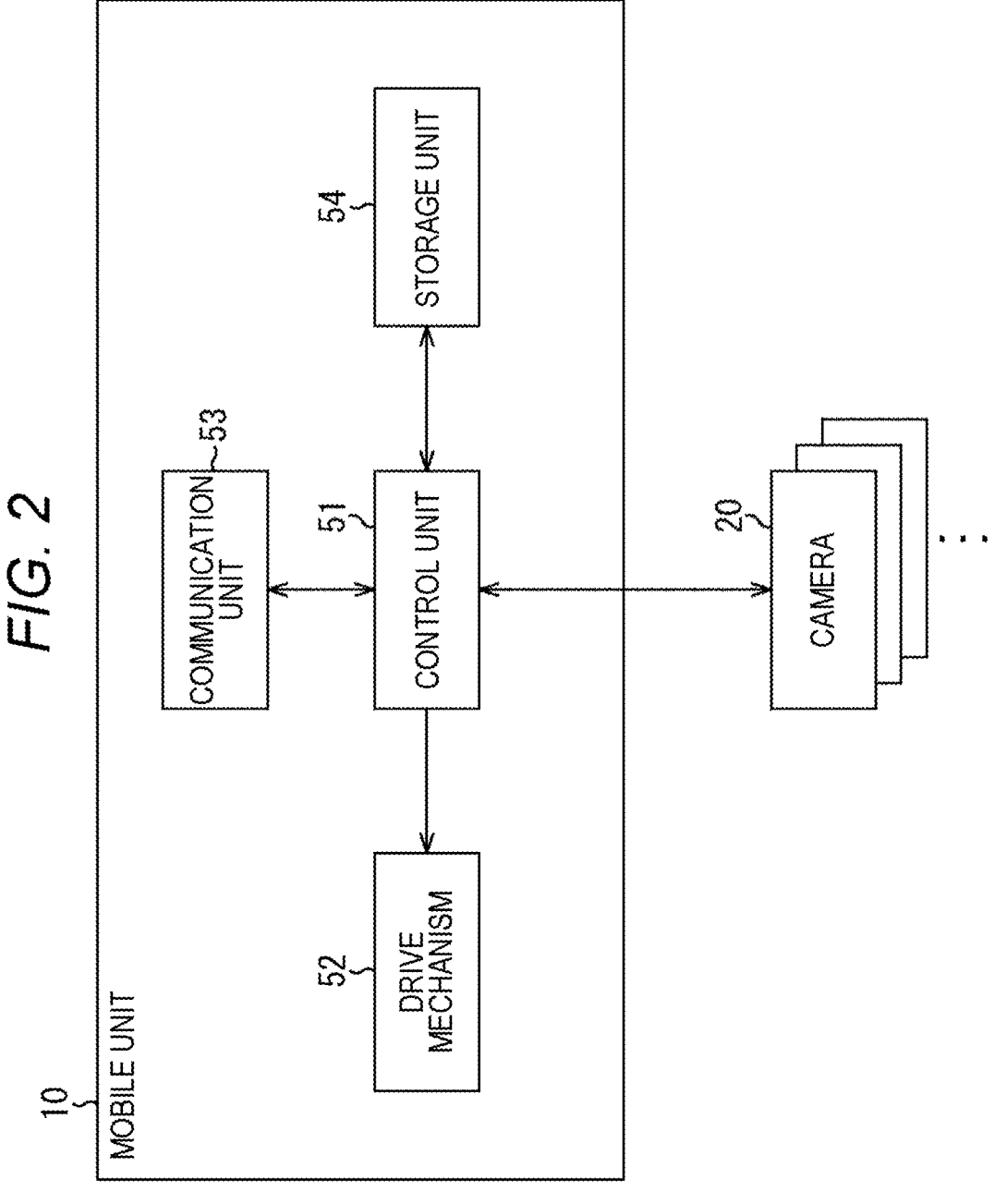
FIG. 2 is a block diagram illustrating a functional configuration example of a mobile unit.

FIG. 2 is a block diagram illustrating a functional configuration example of the mobile unit 10.

The mobile unit 10 includes a control unit 51, a drive mechanism 52, a communication unit 53, and a storage unit 54.

The control unit 51 includes a processor such as a central processing unit (CPU), a memory, and the like, and controls the drive mechanism 52, the communication unit 53, and the storage unit 54 by executing a predetermined program. Additionally, the control unit 51 controls imaging by the camera 20. Moreover, the control unit 51 generates a trigger for performing various types of processing.

The drive mechanism 52 is a mechanism for moving the mobile unit 10. In this example, the mobile unit 10 is a drone, and the drive mechanism 52 includes a motor, a propeller, and the like as a flight mechanism.

The communication unit 53 includes a network interface and the like, and performs wireless or wired communication with the mobile terminal 30, a controller for operating the mobile unit 10, and the like. For example, the communication unit 53 may directly communicate with a communication partner device, or may perform network communication via a Wi-Fi (registered trademark), 4G, or 5G base station or a repeater.

The storage unit 54 includes a nonvolatile memory such as a flash memory, and stores various types of information under the control of the control unit 51.

(Functional Configuration Example of Mobile Terminal)

Figure 3:
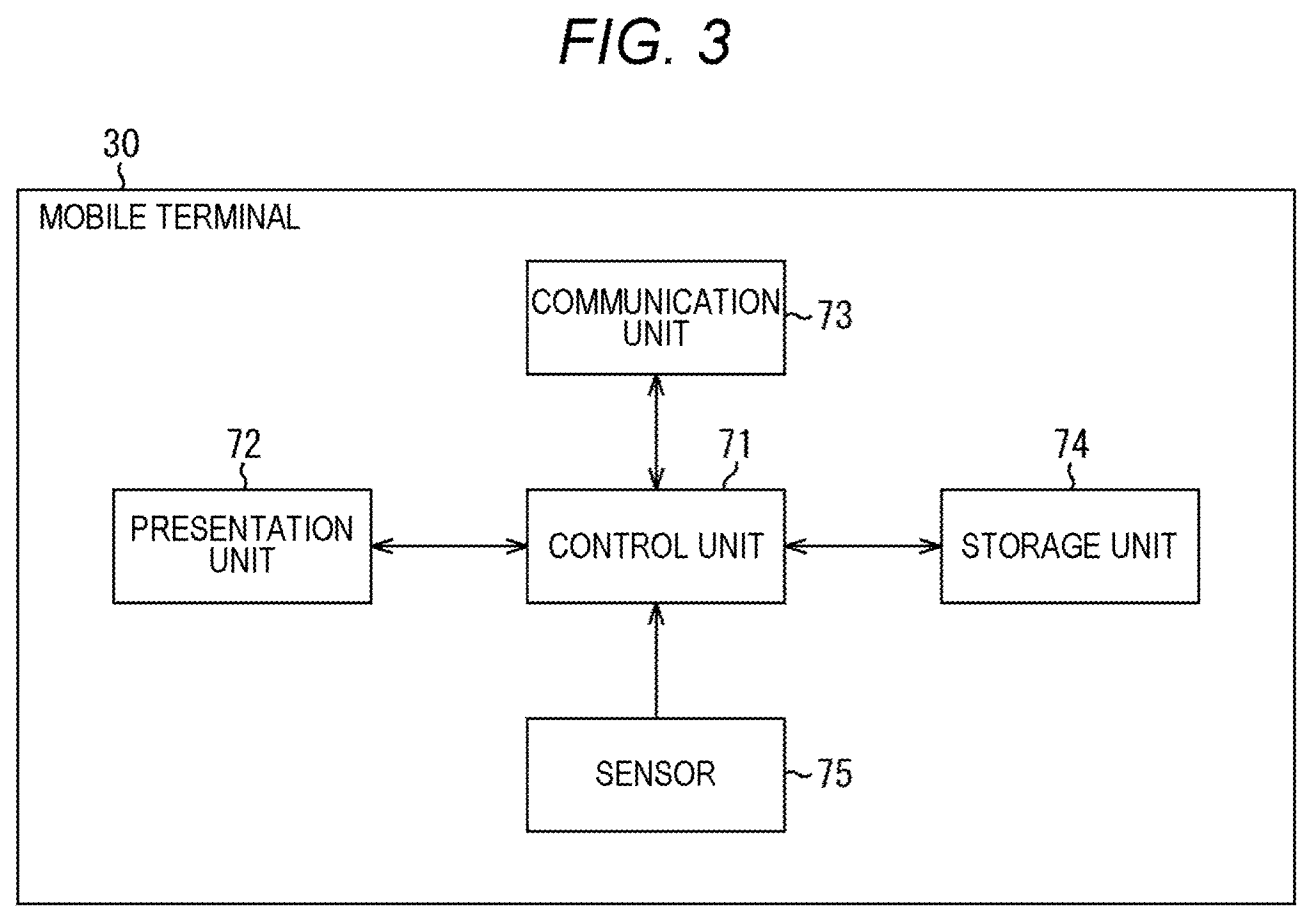

FIG. 3 is a block diagram illustrating a functional configuration example of the mobile terminal 30.

The mobile terminal 30 includes a control unit 71, a presentation unit 72, a communication unit 73, a storage unit 74, and a sensor 75.

The control unit 71 includes a processor such as a CPU, a memory, and the like, and controls the presentation unit 72, the communication unit 73, the storage unit 74, and the sensor 75 by executing a predetermined program.

The presentation unit 72 includes an organic electroluminescence (EL) display, a liquid crystal display, a speaker, a motor that rotates an eccentric weight, a linear resonant actuator, and the like, and presents information to the user by display, sound, vibration, and the like.

The communication unit 73 includes a network interface and the like, and performs wireless or wired communication with the mobile unit 10.

The storage unit 74 includes a nonvolatile memory such as a flash memory, and stores various types of information under the control of the control unit 71.

The sensor 75 includes an acceleration sensor, a gyro sensor, and the like, and acquires sensor data such as acceleration data and angular velocity data of the mobile terminal 30.

<2. Example of Camera Calibration>

Next, an example of camera calibration by the camera calibration system 1 will be described with reference to FIGS. 4 and 5.

Figure 4:
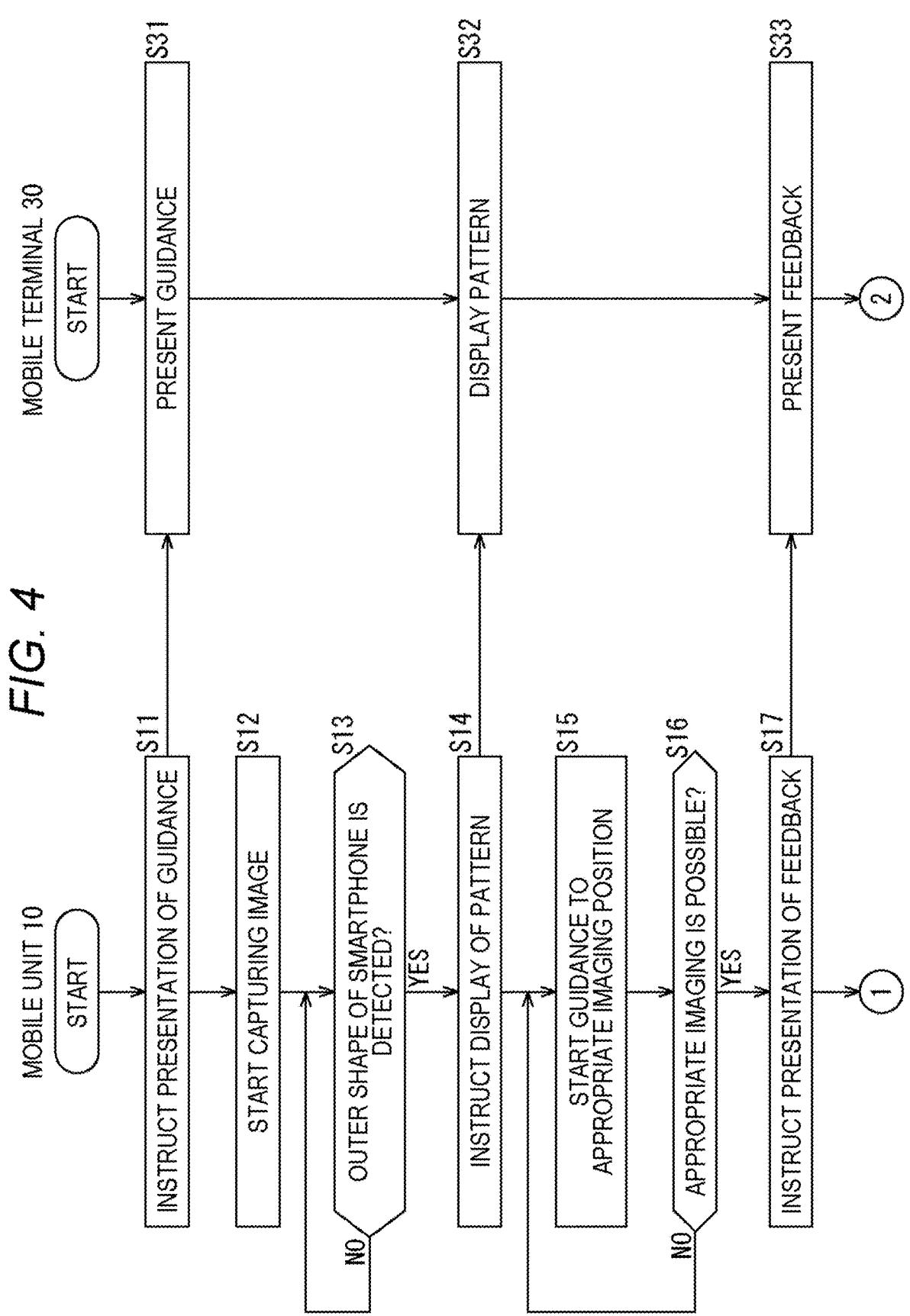
FIG. 4 is a flowchart illustrating an example of camera calibration.
Figure 5:
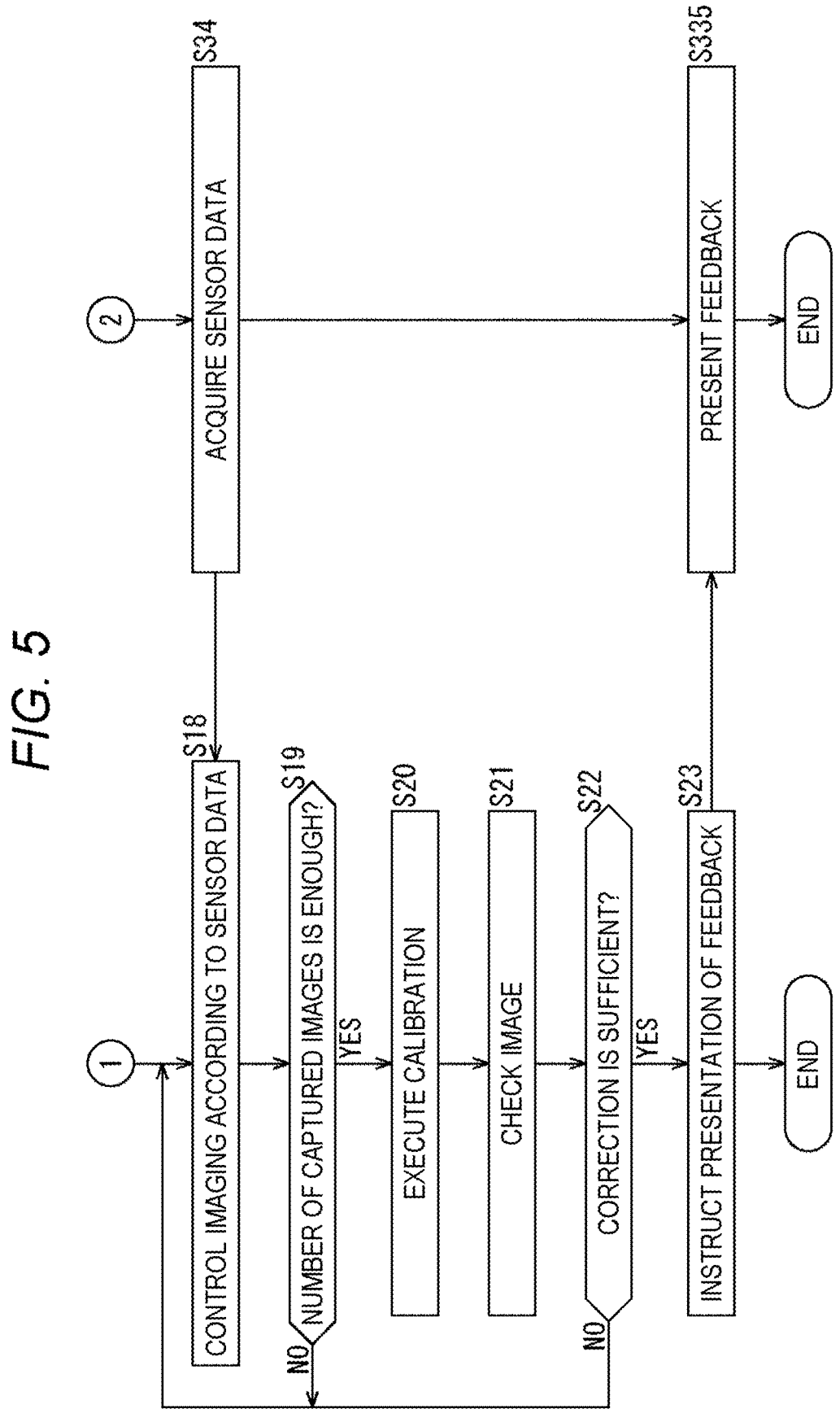
FIG. 5 is a flowchart illustrating an example of camera calibration.

Processing in FIGS. 4 and 5 is started when calibration is required in any of the cameras 20 included in the mobile unit 10, and is executed by the communication unit 53 of the mobile unit 10 and the communication unit 73 of the mobile terminal 30 communicating with each other.

Whether or not calibration is required in the camera 20 is determined, for example, by comparing left and right images captured by the camera 20 configured as a stereo camera.

In step S11, the control unit 51 of the mobile unit 10 generates a trigger for presenting guidance for notifying the user of the camera 20 to be calibrated, thereby instructing the mobile terminal 30 to present the guidance.

In step S31, the control unit 71 of the mobile terminal 30 presents guidance on the basis of the instruction from the mobile unit 10.

Guidance is presented by at least one of vibration or sound in the mobile terminal 30 according to the distance between the camera 20 to be calibrated and the mobile terminal 30. For example, as the user brings the mobile terminal 30 closer to the camera 20 that requires calibration, the vibration of the mobile terminal 30 increases, the sound output from the mobile terminal 30 increases, or the sound itself changes.

Additionally, as guidance, an arrow indicating a direction in which the camera 20 exists may be displayed on a display of the mobile terminal so that the user can more reliably bring the mobile terminal 30 closer to the camera 20 that requires calibration.

Moreover, guidance may be presented by light emission of a light emitting unit such as a light emitting diode (LED) light emitter provided in the camera 20 that requires calibration.

As a result, the user can move the mobile terminal 30 to the vicinity of the camera 20 to be calibrated.

When such guidance is presented, in step S12, the control unit 51 of the mobile unit 10 controls the camera 20 to be calibrated to start capturing an image by the camera 20. The captured image may be a real-time moving image or a still image captured at predetermined time intervals. The capturing of the image by the camera 20 is continued, for example, until imaging for calibration is started.

In step S13, the control unit 51 of the mobile unit 10 determines whether or not the outer shape of the smartphone (mobile terminal 30) has been detected in the image captured by the camera 20 to be calibrated. This processing is repeated until the outer shape of the smartphone is detected. On the other hand, when the outer shape of the smartphone is detected, the processing proceeds to step S14. According to the processing in step S13, it is possible to prevent a part of the pattern displayed on the mobile terminal 30 from being cut off in the image captured by the camera 20.

In step S14, the control unit 51 of the mobile unit 10 generates a trigger for displaying a pattern imaged by the camera 20 to be calibrated on the mobile terminal 30, thereby instructing the mobile terminal 30 to display the pattern.

In step S32, the control unit 71 of the mobile terminal 30 displays the pattern on the display forming the presentation unit 72 on the basis of an instruction from the mobile unit 10.

Figure 6:
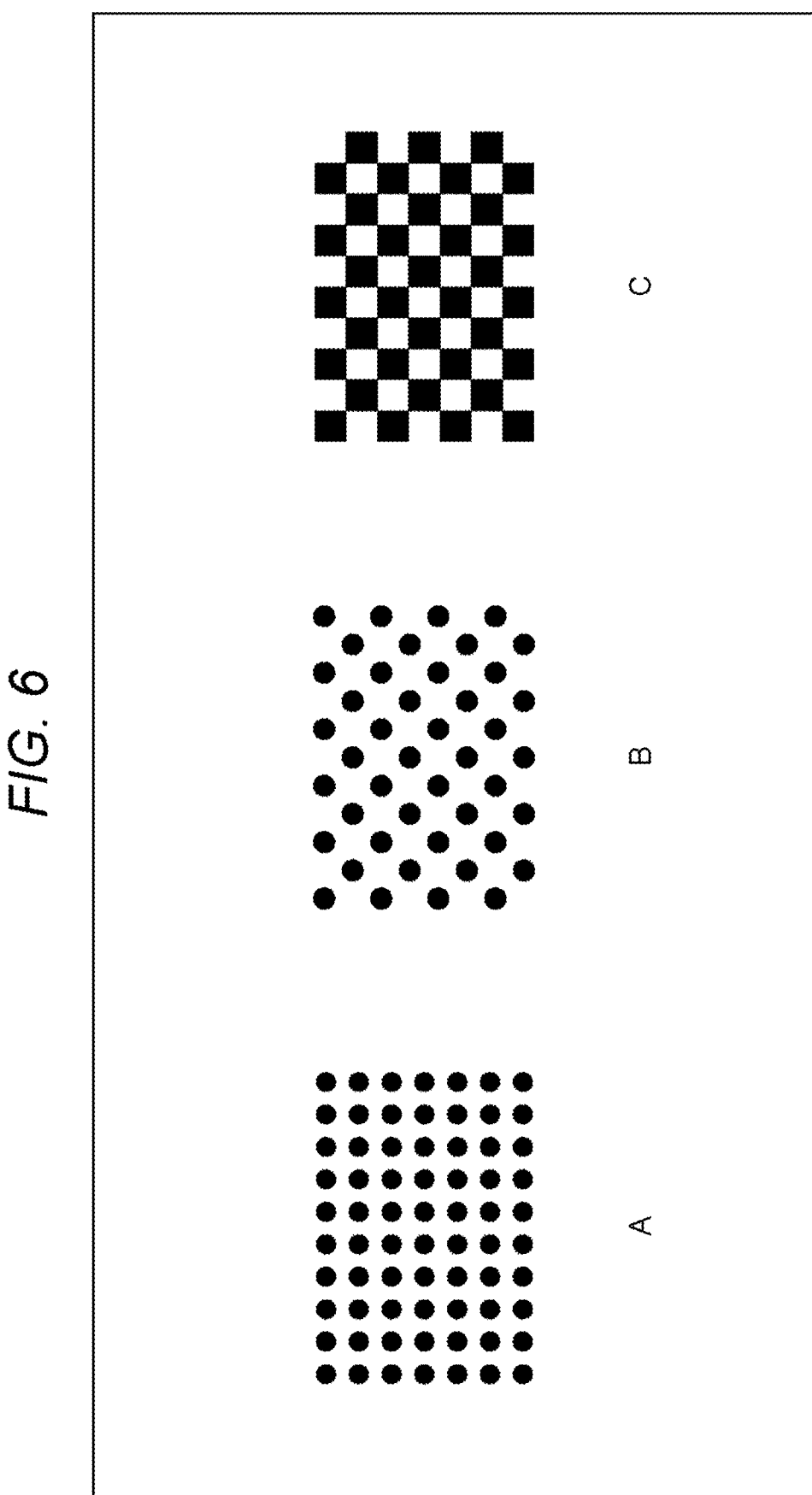
FIG. 6 is a diagram illustrating an example of a calibration pattern.

FIG. 6 is a diagram illustrating an example of a pattern (calibration pattern) displayed on the mobile terminal 30.

Diagram A of FIG. 6 illustrates a circle grid of a circular symmetric pattern, and diagram B illustrates a circle grid of a circular asymmetric pattern. Additionally, diagram C illustrates a chessboard.

In the calibration of the camera 20, camera parameters are estimated on the basis of an image in which a pattern having a known size is imaged a plurality of times from different positions and angles as illustrated in FIG. 6.

In step S15, the control unit 51 of the mobile unit 10 controls driving of the gimbals of the camera 20, for example, to start guiding the camera 20 to an appropriate imaging position. The camera 20 may be guided to an appropriate imaging position by movement of the mobile unit 10 itself.

Then, in step S16, the control unit 51 of the mobile unit 10 determines whether or not appropriate imaging (imaging for calibration) is possible on the basis of the image captured by the camera 20. Steps S15 and S16 are repeated until appropriate imaging becomes possible, and when appropriate imaging becomes possible, the processing proceeds to step S17. Whether or not appropriate imaging is possible is determined by, for example, a pattern appearing in an image captured by the camera 20.

In step S17, the control unit 51 of the mobile unit 10 generates a trigger for presenting feedback to the user indicating that appropriate imaging has become possible, thereby instructing the mobile terminal 30 to present the feedback.

In step S33, the control unit 71 of the mobile terminal 30 presents feedback on the basis of the instruction from the mobile unit 10.

The feedback is presented by at least one of vibration or sound in the mobile terminal 30. For example, when the user holds the mobile terminal 30 over the camera 20 that needs to be calibrated, or the like, and the mobile terminal 30 (pattern) is arranged at a position where appropriate imaging is possible, the mobile terminal 30 vibrates or a sound is output from the mobile terminal 30.

When the feedback to the user is presented, in step 34 of FIG. 5, the control unit 71 of the mobile terminal 30 controls the sensor 75 to acquire sensor data such as acceleration data and angular velocity data of the mobile terminal 30. The acquired sensor data is transmitted to the mobile unit 10.

In step S18, the control unit 51 of the mobile unit 10 controls imaging for calibration by the camera 20 according to the sensor data from the mobile terminal 30. For example, the control unit 51 of the mobile unit 10 sets at least one of the shutter speed or the diaphragm value of the lens of the camera 20 on the basis of the sensor data acquired in the mobile terminal 30.

For example, in a case where the user holds the mobile terminal 30 (pattern) over the camera 20 so as to move the mobile terminal 30 relatively slowly, the shutter speed is set to be low according to the acceleration data and the angular velocity data of the mobile terminal 30 at that time. Conversely, in a case where the user holds the mobile terminal 30 over the camera 20 so as to move the mobile terminal 30 relatively quickly, the shutter speed is set to be high according to the acceleration data and the angular velocity data of the mobile terminal 30 at that time.

The pattern is imaged with the exposure at the shutter speed and the diaphragm value set in this manner, whereby the accuracy of calibration can be enhanced.

In step S19, the control unit 51 of the mobile unit 10 determines whether or not the number of captured images obtained by imaging for calibration is enough. If it is determined that the number of captured images is not enough, steps S18 and S19 are repeated, and if it is determined that the number of captured images is enough, the processing proceeds to step S20.

Note that feedback indicating that appropriate imaging has become possible may be presented for each imaging for calibration.

In step S20, the control unit 51 of the mobile unit 10 executes calibration on the basis of the images obtained by a plurality of times of imaging to estimate the camera parameters.

Thereafter, in step S21, the control unit 51 of the mobile unit 10 images the pattern by controlling the camera 20, corrects the obtained image with the estimated camera parameters, and then checks the corrected image.

In step S22, the control unit 51 of the mobile unit 10 determines whether or not the correction of the checked image is sufficient. If it is determined that the correction is not sufficient, there is a possibility that the estimated camera parameter is not appropriate. Therefore, the processing returns to step S18, and imaging, calibration, and image check are repeated.

On the other hand, if it is determined that the correction is sufficient, that is, if the estimated camera parameter is appropriate, the processing proceeds to step S23.

In step S23, the control unit 51 of the mobile unit 10 generates a trigger for presenting feedback to the user indicating that the calibration has been properly completed, thereby instructing the mobile terminal 30 to present the feedback.

In step S35, the control unit 71 of the mobile terminal 30 presents feedback on the basis of the instruction from the mobile unit 10.

The feedback here is presented by at least one of sound or display on the mobile terminal 30. For example, a voice indicating that the calibration has been properly completed is output from the mobile terminal 30, or a screen indicating that the calibration has been properly completed is displayed on the display forming the presentation unit 72.

According to the above processing, calibration is performed by the user holding the pattern displayed on the mobile terminal 30 over the camera 20 so that the pattern is imaged at various angles, and thus simpler camera calibration can be achieved.

Additionally, since feedback to the user is presented according to whether or not appropriate imaging is possible, the user can easily determine that appropriate imaging is performed.

Moreover, since the user simply holds the mobile terminal 30 in his/her hand and holds the mobile terminal 30 over the camera 20, the burden on the user can be reduced and the operational feeling can be improved as compared with the case of performing imaging with the drone in the user's hand.

<3. Display Example of Calibration Pattern>

Here, a display example of the calibration pattern will be described.

(Index)

In the calibration, an index is assigned to each figure having a known size arranged in the calibration pattern. At this time, in a case where a part of the pattern displayed on the mobile terminal 30 is cut off or hidden by the user's finger or the like, the index is not correctly assigned to the figure, or the assigned index is not referred to. As a result, there is a possibility that appropriate calibration is not performed.

Figure 7:
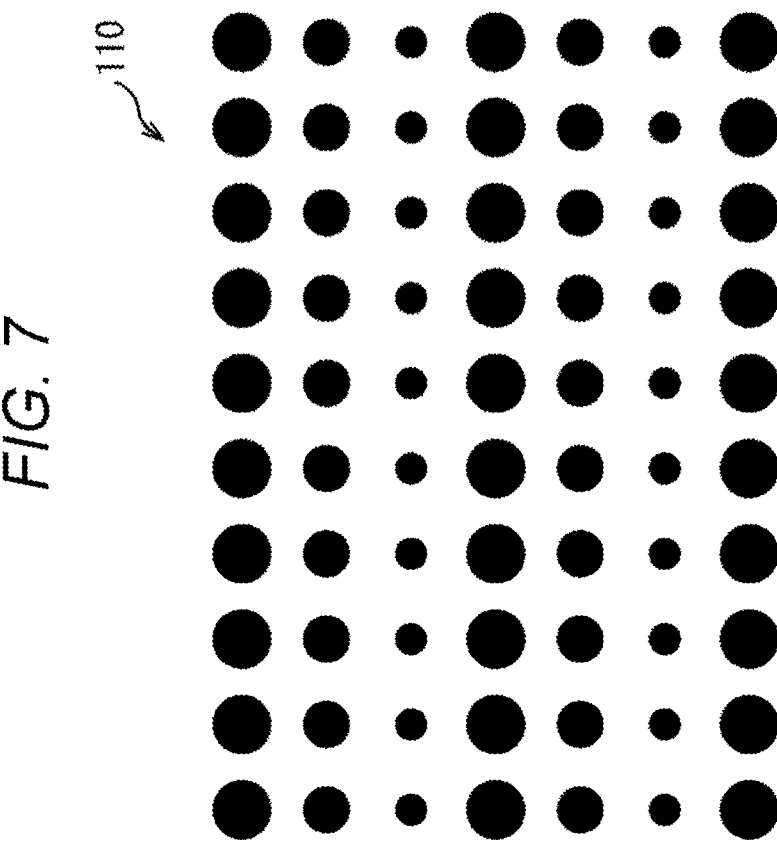
FIG. 7 is a diagram illustrating a display example of a calibration pattern.

Therefore, for example, as illustrated in FIG. 7, a pattern 110 in which figures of different sizes are periodically arranged is displayed. In the pattern 110, circles of three sizes are periodically arranged. According to the pattern 110, it is possible to detect that the circles of three sizes are not periodically arranged when a part of the pattern 110 is cut off or hidden by the user's finger or the like. In this case, by presenting an alert to the user and appropriately displaying the pattern 110, appropriate calibration can be performed.

Figure 8:
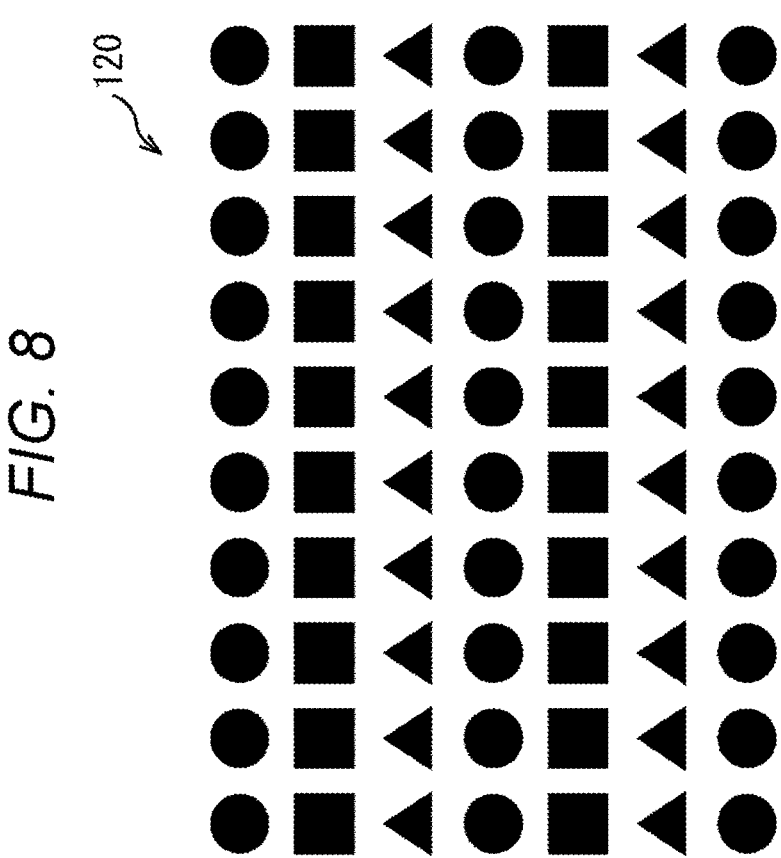
FIG. 8 is a diagram illustrating a display example of a calibration pattern.

Similarly, as illustrated in FIG. 8, a pattern 120 in which figures having different shapes are periodically arranged may be displayed. In the pattern 120, a circle, a square, and a triangle are periodically arranged. According to the pattern 120, it is possible to detect that the figures having the three shapes are not periodically arranged when a part of the pattern 120 is cut off or hidden by the user's finger or the like. In this case, too, by presenting an alert to the user and appropriately displaying the pattern 120, appropriate calibration can be performed.

(Shape of Entire Calibration Pattern)

It is also possible to change the shape of an entire pattern in which figures are periodically arranged as in the pattern illustrated in FIG. 6.

Figure 9:
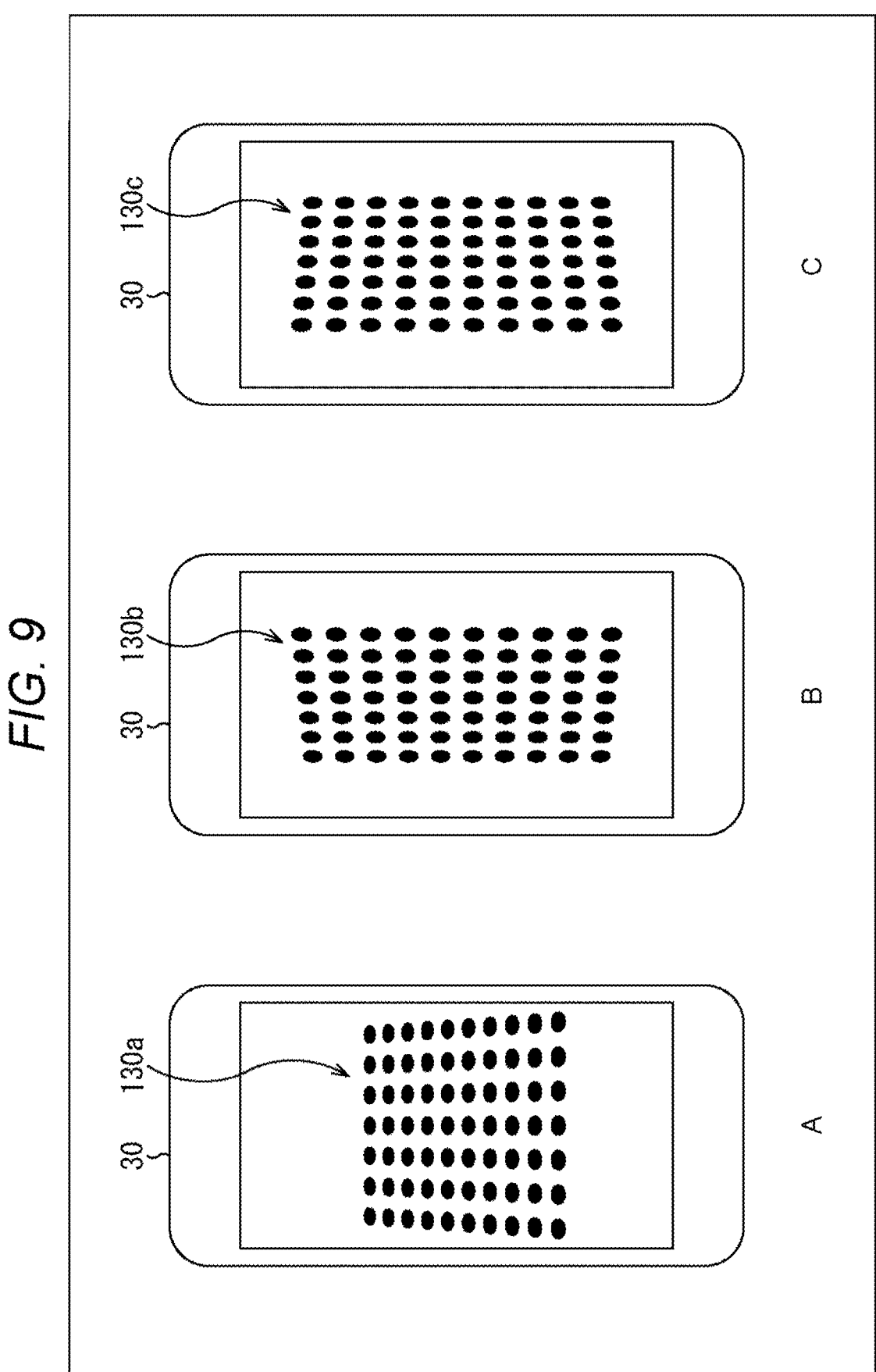
FIG. 9 is a diagram illustrating a display example of a calibration pattern.

FIG. 9 is a diagram illustrating a display example of a calibration pattern in which the overall shape is changed. FIG. 9 illustrates examples in which the shape of the entire circle grid having a circular symmetrical pattern is changed on the mobile terminal 30.

Specifically, diagram A of FIG. 9 illustrates an isosceles trapezoidal circle grid 130a in which the shorter base of the trapezoid is on the upper side. The circle grid 130a adopts a display mode in which a vertically long rectangular circle grid is tilted with the upper side of the mobile terminal 30 toward the far side of the screen and the lower side of the mobile terminal 30 toward the near side of the screen.

Diagram B of FIG. 9 illustrates an isosceles trapezoidal circle grid 130b in which the shorter base of the trapezoid is on the left side. The circle grid 130b adopts a display mode in which a vertically long rectangular circle grid is tilted with the left side of the mobile terminal 30 toward the far side of the screen and the right side of the mobile terminal 30 toward the near side of the screen.

Diagram C of FIG. 9 illustrates an isosceles trapezoidal circle grid 130c in which the shorter base of the trapezoid is on the right side. The circle grid 130c adopts a display mode in which a vertically long rectangular circle grid is tilted with the right side of the mobile terminal 30 toward the far side of the screen and the left side of the mobile terminal 30 toward the near side of the screen.

The trigger for changing the shape of the entire pattern as described above is generated by the control unit 51 of the mobile unit 10, and the mobile terminal 30 is instructed to change the shape of the entire pattern.

By changing the shape of the entire pattern on the mobile terminal 30 in this manner, it is possible to display a pattern as if the mobile terminal 30 is tilted at various angles. As a result, calibration can be achieved even in a state where the mobile terminal 30 is fixed.

Note that while the shape of the entire circle grid having the circular symmetrical pattern is changed on the mobile terminal 30 in the example of FIG. 9, it is also possible to change the shape of an entire other pattern.

(Size of Entire Calibration Pattern)

The size of the entire pattern may be changed according to the distance between the camera 20 and the mobile terminal 30.

Figure 10:
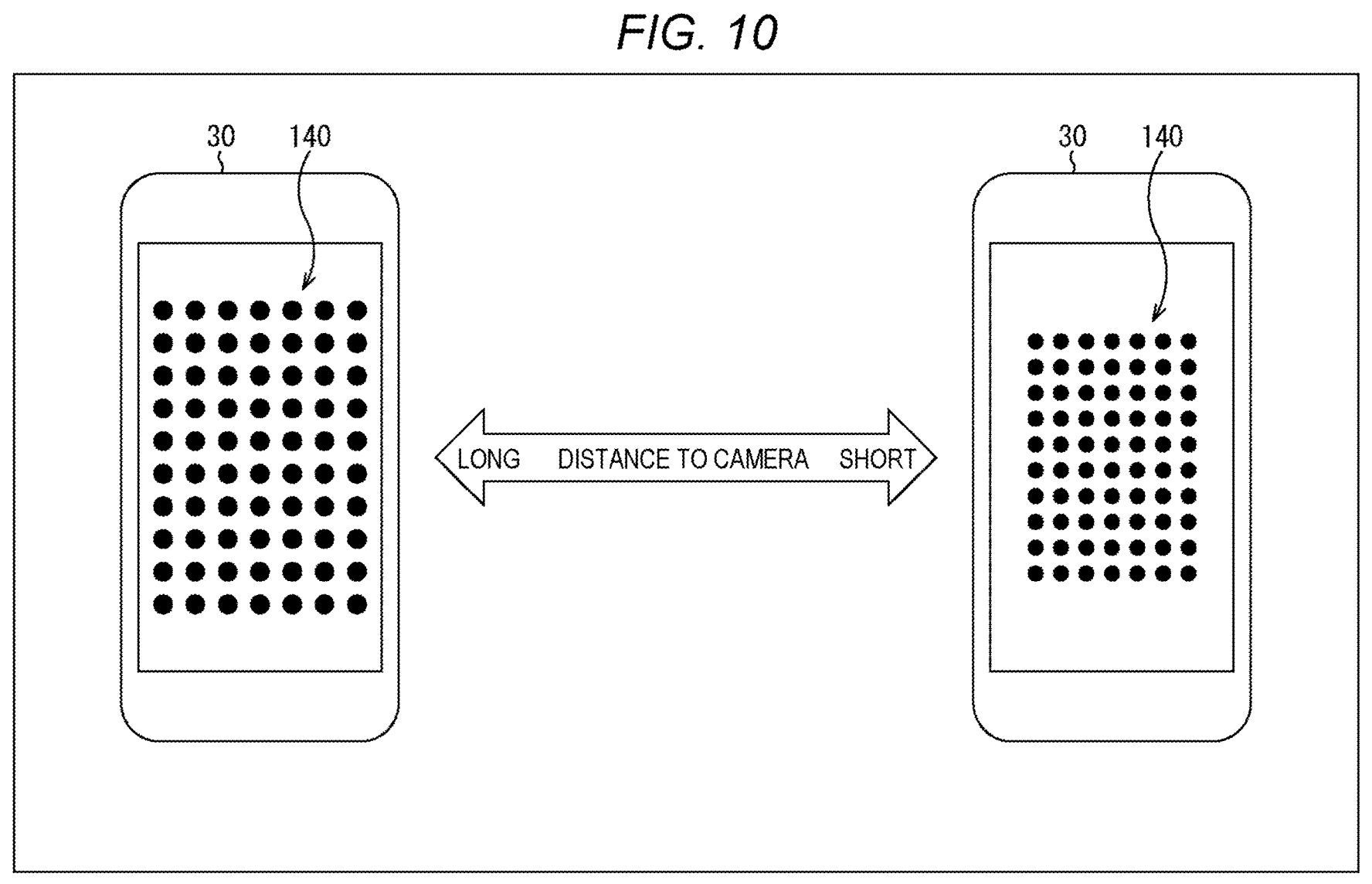

FIG. 10 is a diagram illustrating a display example of a calibration pattern in which the overall size is changed according to the distance to the camera 20. FIG. 10 illustrates an example in which the size of the entire circle grid having a circular symmetric pattern is changed on the mobile terminal 30.

Specifically, on the mobile terminal 30, a circle grid 140 is displayed larger as the distance to the camera 20 is longer (larger), and the circle grid 140 is displayed smaller as the distance to the camera 20 is shorter (smaller).

The trigger for changing the size of the entire pattern as described above is generated by the control unit 51 of the mobile unit 10, and the mobile terminal 30 is instructed to change the size of the entire pattern.

In this way, by changing the size of the entire pattern according to the distance to the camera 20, the camera 20 can image a pattern of the same size regardless of the distance to the mobile terminal 30.

Note that while the size of the entire circle grid having the circular symmetrical pattern is changed on the mobile terminal 30 in the example of FIG. 10, it is also possible to change the size of an entire other pattern.

(Color of Entire Calibration Pattern)

The color of the overall pattern may be changed.

Figure 11:
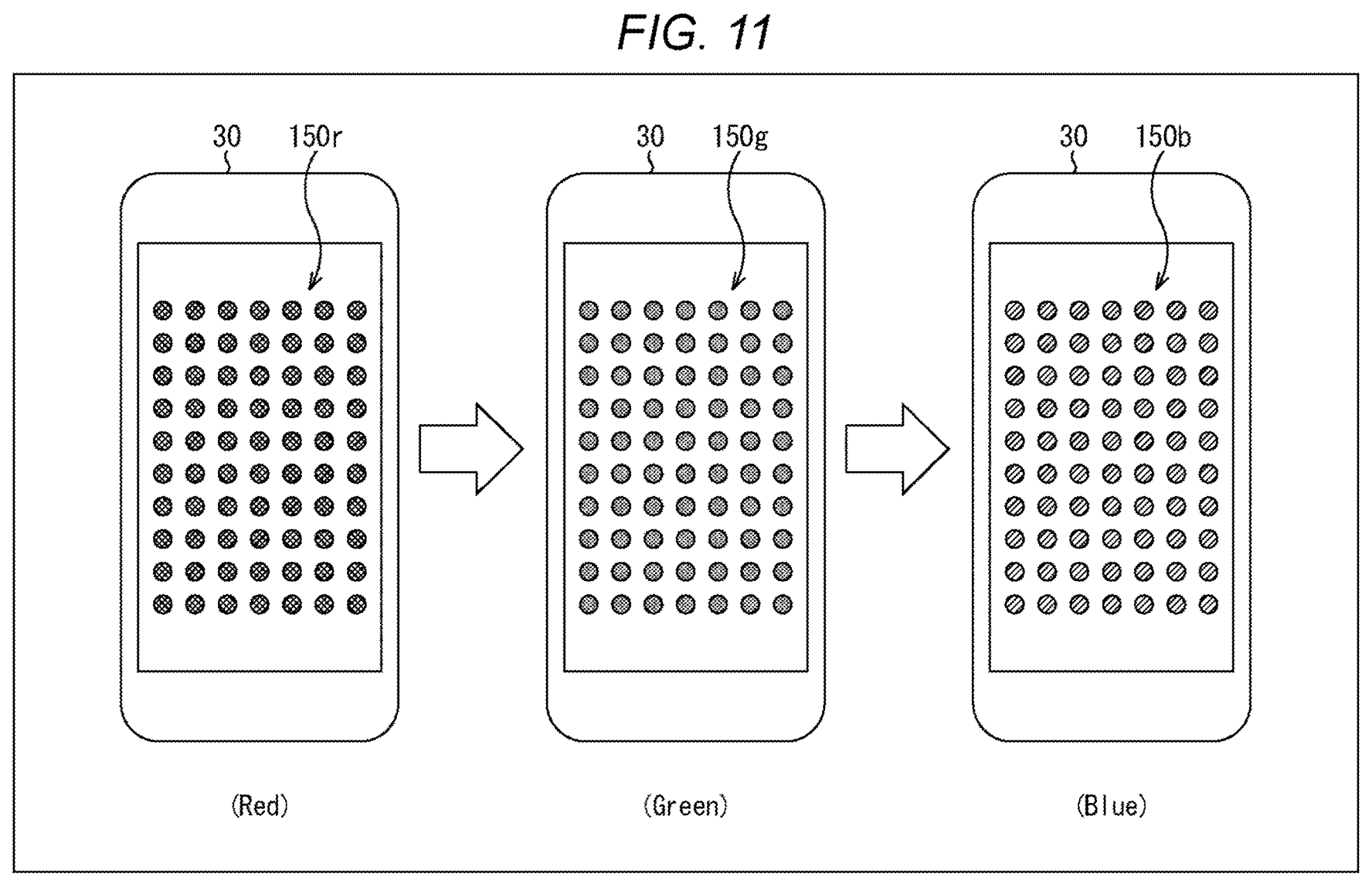

FIG. 11 is a diagram illustrating a display example of a calibration pattern in which the overall color is changed. FIG. 11 illustrates an example in which the color of the entire circle grid having a circular symmetric pattern is changed on the mobile terminal 30.

In the example of FIG. 11, on the mobile terminal 30, first, a circle grid 150*r* in which red circles are arranged is displayed, next, a circle grid 150*g* in which green circles are arranged is displayed, and finally, a circle grid 150*b* in which blue circles are arranged is displayed.

The trigger for changing the color of the entire pattern as described above is generated by the control unit 51 of the mobile unit 10, and the mobile terminal 30 is instructed to change the color of the entire pattern.

In this way, by changing the color of the entire pattern, it is possible to achieve calibration of each color channel of R, G, and B.

Note that while the color of the entire circle grid having the circular symmetrical pattern is changed on the mobile terminal 30 in the example of FIG. 11, it is also possible to change the color of an entire other pattern.

<4. Another Example of Camera Calibration>

In the example of the camera calibration described with reference to FIGS. 4 and 5, processing is determined on the mobile unit 10 side, such as the control unit 51 of the mobile unit 10 generating a trigger for displaying a pattern or a trigger for presenting feedback.

Not limited to this, in a case where the processing performance of the control unit 71 of the mobile terminal 30 is high, processing can be determined on the mobile terminal 30 side, for example, by the control unit 71 of the mobile terminal 30, generating a trigger for displaying a pattern or a trigger for presenting feedback.

Therefore, with reference to FIGS. 12 and 13, an example of camera calibration for which processing is determined by a mobile terminal 30 will be described.

Figure 12:
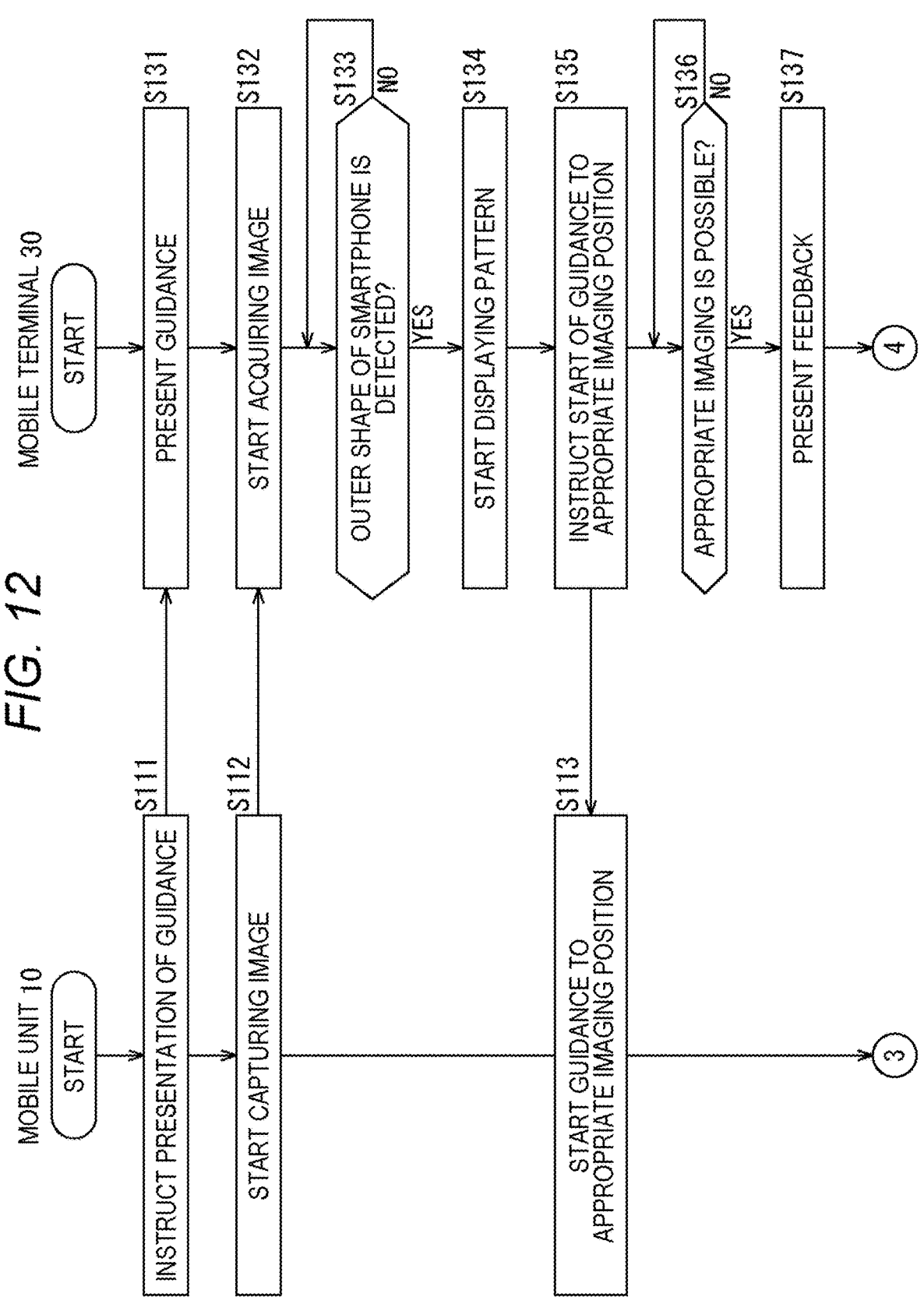
FIG. 12 is a flowchart illustrating another example of camera calibration.

The processing in FIGS. 12 and 13, too, is started when calibration is required in any of cameras 20 included in a mobile unit 10, and is executed by a communication unit 53 of the mobile unit 10 and a communication unit 73 of the mobile terminal 30 communicating with each other.

In step S111, a control unit 51 of the mobile unit 10 generates a trigger for presenting guidance for notifying the user of the camera 20 to be calibrated, thereby instructing the mobile terminal 30 to present the guidance.

In step S131, a control unit 71 of the mobile terminal 30 presents guidance on the basis of the instruction from the mobile unit 10.

When the guidance is presented, in step S112, the control unit 51 of the mobile unit 10 controls the camera 20 to be calibrated to start capturing an image by the camera 20. The capturing of the image by the camera 20 is continued, for example, until imaging for calibration is started, and the captured image is sequentially transmitted to the mobile unit 10.

That is, in step S132, the control unit 71 of the mobile terminal 30 starts acquisition of images transmitted from the mobile unit 10.

In step S133, the control unit 71 of the mobile terminal 30 determines whether or not the outer shape of the smartphone (mobile terminal 30) has been detected in the image captured by the camera 20 to be calibrated. This processing is repeated until the outer shape of the smartphone is detected.

On the other hand, when the outer shape of the smartphone is detected, the processing proceeds to step S134.

In step S134, the control unit 71 of the mobile terminal 30 generates a trigger for displaying a pattern imaged by the camera 20 to be calibrated on the mobile terminal 30, thereby causing the display forming a presentation unit 72 to start displaying the pattern.

Thereafter, in step S135, the control unit 71 of the mobile terminal 30 instructs the mobile unit 10 to start guiding the camera 20 to an appropriate imaging position. In step S113, the control unit 51 of the mobile unit 10 controls driving of the gimbals of the camera 20, for example, to start guiding the camera 20 to an appropriate imaging position.

Then, in step S136, the control unit 71 of the mobile terminal 30 determines whether or not appropriate imaging (imaging for calibration) is possible on the basis of the image transmitted from the mobile unit 10. Step S136 is repeated until appropriate imaging becomes possible, and when appropriate imaging becomes possible, the process proceeds to step S137.

In step S137, the control unit 71 of the mobile terminal 30 generates a trigger for presenting feedback to the user indicating that appropriate imaging has become possible, thereby causing the presentation unit 72 to present the feedback.

When the feedback to the user is presented, in step 138 of FIG. 13, the control unit 71 of the mobile terminal 30 controls a sensor 75 to acquire sensor data such as acceleration data and angular velocity data of the mobile terminal 30. The acquired sensor data is transmitted to the mobile unit 10.

In step S114, the control unit 51 of the mobile unit 10 controls imaging for calibration by the camera 20 according to the sensor data from the mobile terminal 30. In step S115, the control unit 51 of the mobile unit 10 transmits an image obtained by imaging for calibration to the mobile terminal 30.

In step S139, the control unit 71 of the mobile terminal 30 determines whether or not the number of captured images transmitted from the mobile unit 10 is enough. If the number of captured images is not enough, steps S138, S114, S115, and S139 are repeated. If it is determined that the number of captured images is enough, the processing proceeds to step S140.

In step S140, the control unit 71 of the mobile terminal 30 executes calibration on the basis of the images obtained by a plurality of times of imaging to estimate the camera parameters.

Thereafter, in step S141, the control unit 71 of the mobile terminal 30 corrects the image in which the pattern is imaged by the camera 20 with the estimated camera parameters, and then checks the corrected image.

In step S142, the control unit 71 of the mobile terminal 30 determines whether or not the correction of the checked image is sufficient. If it is determined that the correction is not sufficient, there is a possibility that the estimated camera parameter is not appropriate. Therefore, the processing returns to step S138, and imaging, calibration, and image check are repeated.

On the other hand, if it is determined that the correction is sufficient, that is, if the estimated camera parameter is appropriate, the processing proceeds to step S143.

In step S143, the control unit 71 of the mobile terminal 30 generates a trigger for presenting feedback to the user indicating that the calibration has been properly completed, thereby causing the presentation unit 72 to present the feedback.

According to the above processing, too, calibration is performed by the user holding the pattern displayed on the mobile terminal 30 over the camera 20 so that the pattern is imaged at various angles, and thus simpler camera calibration can be achieved.

<5. Configuration Example of Computer>

The series of processing described above can be performed by hardware or software. In a case where the series of processing is performed by software, a program that is included in the software is installed on a computer. Here, the computer includes a computer incorporated in dedicated hardware, a general-purpose personal computer, for example, that can execute various functions by installing various programs, and the like.

Figure 14:
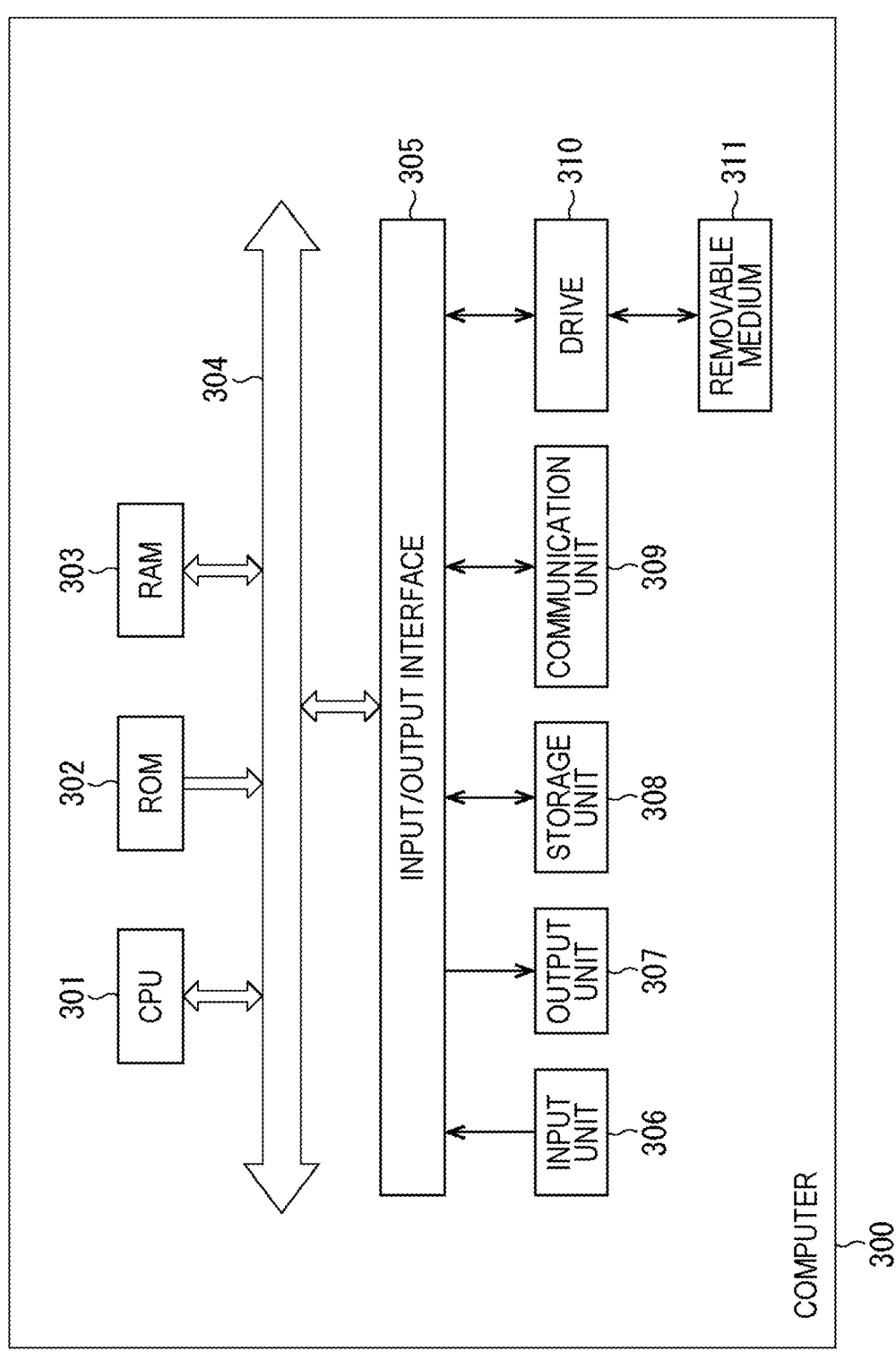
FIG. 14 is a block diagram illustrating a configuration example of a computer.

FIG. 14 is a block diagram illustrating a hardware configuration example of a computer that executes the series of processing described above according to a program.

The mobile unit 10 and the mobile terminal 30 described above are formed as information processing devices, and can be implemented by a computer having the configuration illustrated in FIG. 14.

In a computer, a CPU 301, a read only memory (ROM) 302, and a random access memory (RAM) 303 are mutually connected by a bus 304.

An input/output interface 305 is also connected to the bus 304. An input unit 306, an output unit 307, a storage unit 308, a communication unit 309, and a drive 510 are connected to the input/output interface 305.

The input unit 306 includes a keyboard, a mouse, a microphone, and the like. The output unit 307 includes a display, a speaker, and the like. The storage unit 308 includes a hard disk, a nonvolatile memory, and the like. The communication unit 309 includes a network interface and the like. The drive 310 drives a removable medium 311 such as a magnetic disk, an optical disk, a magneto-optical disk, or a semiconductor memory.

In the computer configured as described above, for example, the CPU 301 loads a program stored in the storage unit 308 to the RAM 303 through the input/output interface 305 and the bus 304, and executes the above-described series of processing.

The program executed by the computer (CPU 301) can be provided by being recorded on the removable medium 311 as a package medium or the like. Additionally, the program can be provided through a wired or wireless transmission medium such as a local area network, the Internet, or digital satellite broadcasting.

In the computer, the program can be installed in the storage unit 308 through the input/output interface 305 by attaching the removable medium 311 to the drive 310. Additionally, the program can be received by the communication unit 309 through a wired or wireless transmission medium and be installed in the storage unit 308. In addition, the program can be installed in advance in the ROM 302 or the storage unit 308.

Note that the program executed by the computer may be a program that performs processing in chronological order according to the order described in the present specification, or a program that performs processing in parallel, or at a necessary timing such as when a call is made.

Embodiments of the present disclosure are not limited to the above-described embodiments, and various modifications can be made without departing from the scope of the present disclosure.

In the present specification, a system refers to a collection of a plurality of components (devices, modules (parts), and the like), and it does not matter whether or not all the components are in the same case. Accordingly, a plurality of devices housed in separate cases and connected through a network, and one device housing a plurality of modules in one case are both systems.

Moreover, the effect described in the present specification is merely an illustration and is not restrictive. Hence, other effects can be obtained.

Moreover, the technology according to the present disclosure can have the following configurations.

(1)

An information processing device including a control unit that, in a case where calibration is required for a camera of a mobile unit, generates a first trigger for displaying a pattern imaged by the camera on a mobile terminal, in which the control unit generates a second trigger for presenting feedback to a user according to whether or not appropriate imaging of the pattern by the camera is possible.

(2)

The information processing device according to (1), in which the control unit generates the first trigger when an outer shape of the mobile terminal is detected.

(3)

The information processing device according to (1) or (2), in which the pattern is a circle grid.

(4)

The information processing device according to (3), in which the circle grid is a circular symmetrical pattern or a circular asymmetrical pattern.

(5)

The information processing device according to (1) or (2), in which the pattern is a chessboard.

(6)

The information processing device according to (1) or (2), in which the pattern is formed by periodically arranging figures of different sizes.

(7)

The information processing device according to (1) or (2), in which the pattern is formed by periodically arranging figures having different shapes.

(8)

The information processing device according to any one of (1) to (5), in which the control unit changes a shape of the entire pattern in which figures are periodically arranged.

(9)

The information processing device according to any one of (1) to (5), in which the control unit changes a size of the entire pattern according to a distance between the camera and the mobile terminal.

(10)

The information processing device according to any one of (1) to (5), in which the control unit changes a color of the entire pattern.

(11)

The information processing device according to any one of (1) to (10), in which the feedback is presented by at least one of vibration or sound in the mobile terminal.

(12)

The information processing device according to any one of (1) to (11), in which the control unit controls imaging for the calibration by the camera in a case where appropriate imaging of the pattern by the camera is possible.

(13)

The information processing device according to (12), in which the control unit sets at least one of a shutter speed or a diaphragm value of a lens of the camera on the basis of sensor data acquired in the mobile terminal.

(14)

The information processing device according to (13), in which the sensor data is acquired by at least one of an acceleration sensor or a gyro sensor.

(15)

The information processing device according to any one of (1) to (14), in which the control unit generates a third trigger for presenting guidance for notifying the user of the camera that is a target of the calibration.

(16)

The information processing device according to (15), in which the guidance is presented by at least one of vibration or sound in the mobile terminal according to a distance between the camera that is a target of the calibration and the mobile terminal.

(17)

The information processing device according to (15), in which the guidance indicates, on the mobile terminal, a direction in which the camera that is a target of the calibration exists.

(18)

The information processing device according to (15), in which the guidance is presented by light emission of a light emitting unit provided in the camera that is a target of the calibration.

(19)

An information processing method including by an information processing device, generating, in a case where calibration is required for a camera of a mobile unit, a first trigger for displaying a pattern imaged by the camera on a mobile terminal, and generating a second trigger for presenting feedback to a user according to whether or not appropriate imaging of the pattern by the camera is possible.

(20)

An information processing system including:

a mobile unit;

a mobile terminal;

a first control unit that generates, in a case where calibration is required for a camera of a mobile unit, a first trigger for displaying a pattern imaged by the camera on a mobile terminal; and a second control unit that generates a second trigger for presenting feedback to a user according to whether or not appropriate imaging of the pattern by the camera is possible.

REFERENCE SIGNS LIST

1 Camera calibration system
10 Mobile unit

20 Camera
30 Mobile terminal
51 Control unit
52 Drive mechanism
53 Communication unit
54 Storage unit
71 Control unit
72 Presentation unit
73 Communication unit
74 Storage unit
75 Sensor

The invention claimed is:

1. A mobile terminal comprising:

a communication circuit; and a control circuit configured to:

in a case where calibration is required for a camera of a holdable mobile device, generate a first trigger that instructs the mobile terminal to display a pattern to be imaged by the camera of the holdable mobile device on the mobile terminal, separate from and spaced apart from the holdable mobile device, receive, via the communication circuit, an image of the displayed pattern captured by the camera of the holdable mobile device;

determine, based on the received image, whether or not appropriate imaging of the pattern is possible, and generate a second trigger that instructs the mobile terminal to present feedback to a user of the mobile terminal according to whether or not appropriate imaging of the pattern displayed on the mobile terminal by the camera of the holdable mobile device is possible, the feedback including an indication to the user that a user initiated imaging will generate an appropriate image.

2. The mobile terminal according to claim 1, wherein the control circuit is configured to generate the first trigger when an outer shape of the mobile terminal is detected.

3. The mobile terminal according to claim 1, wherein the pattern is a circle grid.

4. The mobile terminal according to claim 3, wherein the circle grid is a circular symmetrical pattern or a circular asymmetrical pattern.

5. The mobile terminal according to claim 1, wherein the pattern is a chessboard.

6. The mobile terminal according to claim 1, wherein the pattern is formed by periodically arranging figures of different sizes.

7. The mobile terminal according to claim 1, wherein the pattern is formed by periodically arranging figures having different shapes.

8. The mobile terminal according to claim 1, wherein the control circuit is configured to change a shape of an entirety of the pattern in which figures are periodically arranged.

9. The mobile terminal according to claim 1, wherein the control circuit is configured to change a size of an entirety of the pattern according to a distance between the camera and the mobile terminal.

10. The mobile terminal according to claim 1, wherein the control circuit is configured to change a color of an entirety of the pattern.

11. The mobile terminal according to claim 1, wherein the feedback is presented by at least one of vibration or sound in the mobile terminal.

12. The mobile terminal according to claim 1, wherein the control circuit is configured to control imaging for the calibration by the camera in a case where appropriate imaging of the pattern by the camera is possible.

13. The mobile terminal according to claim 12, wherein the control circuit is configured to set at least one of a shutter speed or a diaphragm value of a lens of the camera on a basis of sensor data acquired in the mobile terminal.

14. The mobile terminal according to claim 13, wherein the sensor data is acquired by at least one of an acceleration sensor or a gyro sensor.

15. The mobile terminal according to claim 1, wherein the control circuit is configured to generate a third trigger for presenting guidance for notifying the user of the camera that is a target of the calibration.

16. The mobile terminal according to claim 15, wherein the guidance is presented by at least one of vibration or sound in the mobile terminal according to a distance between the camera that is a target of the calibration and the mobile terminal.

17. The mobile terminal according to claim 15, wherein the guidance indicates, on the mobile terminal, a direction in which the camera that is a target of the calibration exists.

18. The mobile terminal according to claim 15, wherein the guidance is presented by light emission of a light source in the camera that is a target of the calibration.

19. An information processing method comprising
by a mobile terminal,
generating, in a case where calibration is required for a camera of a holdable mobile device, a first trigger that instructs the mobile terminal to display a pattern to be imaged by the camera of the holdable mobile device on the mobile terminal, separate from and spaced apart from the holdable mobile device,
receiving an image of the displayed pattern captured by the camera of the holdable mobile device,
determining, based on the received image, whether or not appropriate imaging of the pattern is possible, and
generating a second trigger that instructs the mobile terminal to present feedback to a user of the mobile terminal according to whether or not appropriate imaging of the pattern by the camera of the holdable mobile device is possible, the feedback including an indication to the user that a user initiated imaging will generate an appropriate image.

20. An information processing system comprising:
a holdable mobile device including a camera;
a mobile terminal, separate from and spaced apart from the holdable mobile device, wherein the mobile terminal is configured to display a pattern to be imaged by the camera of the holdable mobile device; and
control circuitry configured to generate in a case where calibration is required for the camera of the holdable mobile device, a first trigger that instructs the mobile terminal to display the pattern;
determine, based on an image of the displayed pattern captured by the camera and transmitted from the holdable mobile device, whether or not appropriate imaging of the pattern is possible; and
a second trigger that instructs the mobile terminal to present feedback to a user of the mobile terminal according to whether or not appropriate imaging of the pattern by the camera of the holdable mobile device is possible, the feedback including an indication to the user that a user initiated imaging will generate an appropriate image.

\* \* \* \* \*